United States Patent [19]
Weigle et al.

[11] 4,456,170
[45] Jun. 26, 1984

[54] CONTROL VALVE

[75] Inventors: Dieter Weigle, Urach; Wilhelm Zirps, Hemmingen; Uwe Schaub, Vaihingen, all of Fed. Rep. of Germany

[73] Assignee: Robert Bosch GmbH, Stuttgart, Fed. Rep. of Germany

[21] Appl. No.: 393,364

[22] Filed: Jun. 29, 1982

[30] Foreign Application Priority Data

Jul. 14, 1981 [DE] Fed. Rep. of Germany ....... 3127729

[51] Int. Cl.³ .......................................... G05D 23/275
[52] U.S. Cl. ..................................... 236/84; 137/491; 236/93 R
[58] Field of Search ............... 236/84, 93 R; 137/491, 137/468

[56] References Cited

U.S. PATENT DOCUMENTS

| 2,830,767 | 4/1958 | Herbenar | 236/93 A X |
| 2,975,976 | 3/1961 | Smith et al. | 236/84 X |
| 3,401,605 | 9/1968 | Born | 137/491 X |
| 3,608,576 | 9/1971 | Wilhelm | 137/491 X |
| 4,303,197 | 12/1981 | Sandau | 137/491 X |
| 4,336,903 | 6/1982 | Zirps | 137/491 X |

Primary Examiner—William E. Tapolcai
Attorney, Agent, or Firm—Michael J. Striker

[57] ABSTRACT

A pressure valve for heating a pressure medium and maintaining its temperature constant, has a control slider provided with a throttle, a pilot valve influencing a position of the control slider and having a spring-loaded valve member and a valve seat, a thermosensor arranged to sense the pressure medium and to determine throttling of the latter, wherein the thermosensor controls an electromagnet acting upon the pilot valve, and the spring of the pilot valve in the opened position of the valve member is at least partially pretensioned, and upon actuation of the electromagnet and assuming by the valve member the closed position the spring is tensioned to a value corresponding an opening pressure.

7 Claims, 2 Drawing Figures

4,456,170

CONTROL VALVE

BACKGROUND OF THE INVENTION

The present invention relates to a control valve for heating a pressure medium and maintaining its temperature constant in a hydraulic device.

Control valves of the above-mentioned general type are known in the art. In a known control valve, a thermosensor is arranged in a pilot valve. Upon exceeding of a fixed operational temperature the thermosensor provides for a bypass via an additional control element for a pressure medium flowing through the control valve. Thereby the control parts are adjusted so that the desired temperature is again attained. Such a valve provides for a sufficient maintenance of the pressure medium temperature. However, it is relatively expensive and not optimal in its operational safety.

SUMMARY OF THE INVENTION

Accordingly, it is an object of the present invention to provide a control valve which avoids the disadvantages of the prior art.

More particularly, it is an object of the present invention to provide a control valve which has a simple construction and guarantees good operational safety.

In keeping with these objects and with others which will become apparent hereinafter, one feature of the present invention resides, briefly stated, in a control valve having a control slider with a pilot valve influencing a position of the control slider and having a spring-loaded valve member, wherein the pilot valve is acted upon by an electromagnet controlled by a thermosensor, and a spring of the pilot valve in open position is unloaded or only partially tensioned, and upon actuation of the electromagnet and assuming by the valve member the closed position, the spring is tensioned to a value corresponding to the opening pressure.

When the control valve is designed in accordance with the present invention, it attains the above-mentioned advantages as compared with the known control valves. Advantageously, the spring in accordance with the invention is completely or extensively unloaded in open position. On the other hand, it is possible to use the operational possibilities of the magnet in optimal manner, inasmuch as only in the last part of the stroke of the magnet spring work is performed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
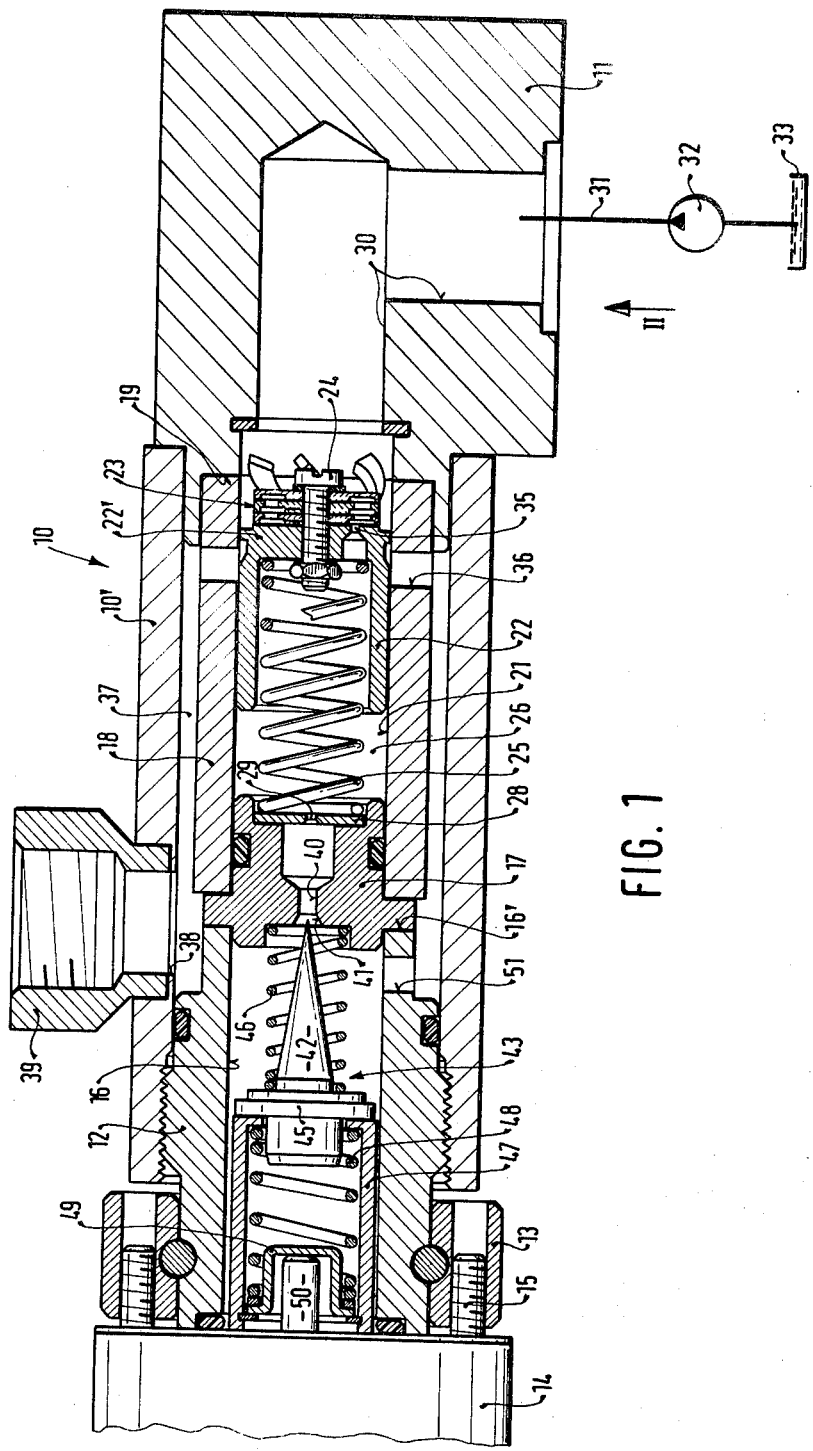
FIG. 1 is a view showing a section of a control valve in accordance with the present invention.
Figure 2:
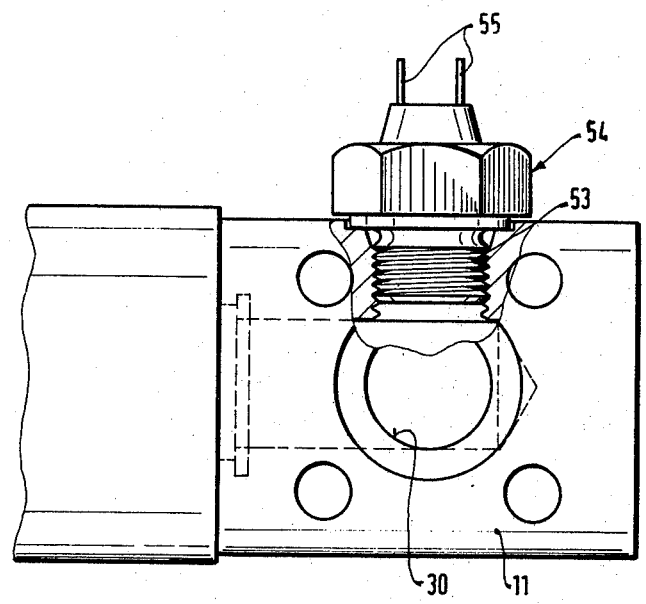
FIG. 2 is a view of the inventive control valve taken in direction II in FIG. 1.

A control valve in accordance with the present invention has a valve housing 10 composed substantially of a tubular central part 10'. The central part 10' is closed at its one end by an inlet cover 11 and at its other end by a housing insert 12 which is screwed in the central part 10'. The housing insert 12 has a part extending beyond the central part 10' and provided at its periphery with a ring 13 which is fixedly arranged thereon. An electromagnet 14 is mounted with the aid of screws 15 on the ring 13.

The housing insert 12 has a central throughgoing opening 16. An end side 16' of the housing insert 12 presses a coaxially arranged annular body 17 against a tubular part 18 which is also coaxial with the above-mentioned part. The tubular part 18 is also pressed by the housing insert 12 against an end side 19 of the cover 11.

The part 18 has an opening 21. A substantially cup-shaped control slider 22 is slidingly guided in the opening 21 of the part 18. A so-called gap filter 23 is mounted with the aid of the screw 24 on the bottom of the control slider 22. A spring 25 arranged in the hollow interior of the control slider 22 acts upon the latter. The spring 25 extends in a pressure chamber 26 and abuts against a plate 28 arranged in the annular body 17. A central throttling opening 29 is provided in the plate 28.

The control slider extends with its end side in an inlet opening 30 provided in the inlet cover 11. A conduit 31 communicates with the inlet opening 30. A pump 33 supplies a pressure medium from a container 32 into the conduit 31 and thereby into the opening 30.

A throttling opening 35 is formed in a bottom 22' of the control slider 22. The throttling opening 35 leads, via the gap filter 23, into the interior of the control slider and provides for communication with the pressure chamber 26. Several throughgoing radial openings 36 are formed in the tubular part 18 near the end side 19 of the inlet cover 11. The radial openings 36 provide for communication from the opening 21 to an annular space 37 between the part 18 and the central part 10'. The annular space 37 reaches an opening 38 which extends through the wall of the central part 10'. An outlet pipe 39 is fitted into the opening 38. A not-shown conduit to a consumer leads from the outlet pipe 39.

A central stepped opening 40 is formed in the annular body 17. It has an inclined shoulder 41 facing away from the control slider 22. The inclined shoulder 41 is formed as a valve seat for a conical valve member 42 of a pilot valve 43.

The valve member 42 has a flange-shaped collar 45. A pressure spring 46 acts upon the collar 45 in opening direction of the valve body. A pressure spring 48 arranged in a displaceable sleeve 47 acts upon the collar 45 in closing direction. The other end of the pressure spring 48 abuts against a spring disc 49.

The electromagnet 14 of the control valve is provided with a pushing rod 50. The spring disc 49 abuts against the pushing rod 50 of the electromagnet 14. When the valve member 42 is in its shown open position, it is unloaded completely or considerably, so that the pressure spring 48 is pre-tensioned only to a small extent.

A throughgoing transverse opening 51 is formed in a wall of the housing insert 12 in the vicinity of the annular body 17. An opening 53 opens into the opening 30 of the inlet cover. A thermosensor 54 is screwed in the opening 53 so that incoming pressure medium always flows around the same. Contacts 55 of the thermosensor 54 are connected with the electromagnet 14.

When the electromagnet 14 is not energized, the pushing rod is withdrawn, the pressure spring 48 is tensioned only inside the sleeve 47, and the valve member 42 is thereby unloaded, so that the pressure spring 46 holds the same in open position. When pressure medium flows into the inlet opening 30, it travels via the gap filter 23 and the throttling opening 35 into the pressure chamber 26. From there the pressure medium travels via the throttling opening 29 and the open valve seat 41 as well as the transverse opening 51 into the outlet opening 38. Because of the pressure drop at the throttling opening 35, the control slider 22 is displaced against the force of the spring 25, thereby communication to the transverse opening 36 is established.

When a lower limit temperature of the pressure medium is exceeded, the thermosensor 54 provides a signal to the electromagnet 14 so that the pushing rod 45 is extended and displaces, via the spring disc 49, the sleeve 47 together with the valve member 42 and the spring 48 against the force of the pressure spring 46 so that the valve member lies on the valve seat 41.

The pressure spring 48 is tensioned only in the last part of the magnet stroke. Thereby the operational possibilities of the magnet can be used in optimum manner, since only in the last part of the magnet stroke (great magnet force) spring work is performed. By the pre-tensioning of the pressure spring 48 in the last part of the magnet stroke, the opening pressure of the valve member 42 is adjusted.

After closing of the opening 40 by the valve member 42, the pressure in the pressure chamber 26 and thereby in the control slider 22 increases. Thereby the control slider 22 is displaced in a direction of closing position, so that the throttling resistance between the control slider and the transverse opening 36 increases and as a result of this the flowing pressure medium is heated. The entire stream now flows throttled via the annular space 37 to the outlet opening 38. When the pressure in the pressure chamber 26 attains a predetermined value, the valve member 42 is lifted against the force of the tensioned spring 48 from the seat. The pressure medium flowing via the throttling opening 29 and the opening 40 travels via the transverse opening 51 also into the annular space 37. Both pressure medium streams are mixed in the annular space 37.

When the desired temperature is attained, the thermosensor 54 produces again a corresponding signal to the electromagnet 14, whereby the pushing rod 50 is retracted. As a result of this the spring 48 is first unloaded inside the sleeve 47, and subsequently the valve member 42 is opened under the action of the spring 46 correspondingly wide. The pressure in the pressure chamber 26 reduces and the throttling resistance at the control slider 22 or at the valve member 42 is reduced. The temperature of the pressure medium no longer increases after dropping of the throttling resistance. When it reduces again, the above-described cycle is again repeated.

It will be understood that each of the elements described above, or two or more together, may also find a useful application in other types of constructions differing from the types described above.

While the invention has been illustrated and described as embodied in a control valve for heating a pressure medium and maintaining its temperature constant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A control valve for heating a pressure medium and maintaining its temperature constant in a hydraulic device, comprising a control slider provided with throttling means for throttling a pressure medium and displaceable under the action of the latter; a pilot valve associated with and influencing a position of said control slider, said pilot valve having a valve seat and a spring-loaded valve member movable between open and closed positions; a spring arranged to load said valve member of said pilot valve; a thermosensor arranged to sense the pressure medium flowing through the control valve and to determine throttling of the pressure medium; and an electromagnet controlled by said thermosensor and acting upon said pilot valve so as to open the latter and to thereby control the temperature of the pressure medium, said spring being located between said electromagnet and said valve member and in the open position of said valve member and with said electromagnetic being deactivated being at most partially pre-tensioned, and upon actuation of said electromagnet and assuming by said valve member the closed position said spring being tensioned to a value corresponding to an opening pressure.

2. A control valve as defined in claim 1, wherein said valve member in said closed position abuts against said valve seat, said spring being tensioned to the value corresponding to an opening pressure when said valve member comes to abutment against said valve seat.

3. A control valve as defined in claim 1, wherein said spring is unloaded when said valve member of said pilot valve is in its open position.

4. A control valve as defined in claim 1, wherein said electromagnet has a pushing rod; and further comprising a displaceable sleeve, said spring being located in said sleeve and having two ends arranged so that one of said ends of said spring acts upon said valve member, whereas the other end of said spring is acted by said pushing rod.

5. A control valve as defined in claim 4; and further comprising a disc actuated by said pushing rod of said electromagnet, said other end of said spring abutting against said spring disc.

6. A control valve as defined in claim 1; and further comprising a second spring arranged so as to counteract said first-mentioned spring which loads said valve member of said pilot valve.

7. A control valve as defined in claim 6, wherein said spring is weaker than said first-mentioned spring.

* * * * *